(12) United States Patent
Kumra et al.

(10) Patent No.: US 10,788,224 B2
(45) Date of Patent: Sep. 29, 2020

(54) WATER-COOLED FAN AND METHOD FOR CONTROLLING MULTIFUNCTIONAL FAN

(71) Applicant: JMATEK (ZHONGSHAN) LTD., Zhongshan (CN)

(72) Inventors: Naresh Kumra, Zhongshan (CN); Yi Pu, Zhongshan (CN)

(73) Assignee: JMATEK (ZHONGSHAN) LTD., Zhongshan (CN)

(*) Notice: Subject to any disclaimer, the term of this patent is extended or adjusted under 35 U.S.C. 154(b) by 168 days.

(21) Appl. No.: 16/230,584

(22) Filed: Dec. 21, 2018

(65) Prior Publication Data
US 2020/0025397 A1   Jan. 23, 2020

(30) Foreign Application Priority Data

Jul. 18, 2018  (CN) .......................... 2018 1 0809088

(51) Int. Cl.
| | | |
|---|---|---|
| *F24F 6/04* | (2006.01) | |
| *B01D 47/00* | (2006.01) | |
| *F28C 1/00* | (2006.01) | |
| *F24F 11/62* | (2018.01) | |
| *F24F 11/50* | (2018.01) | |
| *F24F 11/30* | (2018.01) | |
| *F24F 1/037* | (2019.01) | |
| *F24F 1/035* | (2019.01) | |
| *F24F 13/075* | (2006.01) | |

(52) U.S. Cl.
CPC ................ *F24F 6/04* (2013.01); *B01D 47/00* (2013.01); *F24F 1/035* (2019.02); *F24F 1/037* (2019.02); *F24F 11/30* (2018.01); *F24F 11/50* (2018.01); *F24F 11/62* (2018.01); *F24F 13/075* (2013.01); *F28C 1/00* (2013.01); *F24F 2221/125* (2013.01)

(58) Field of Classification Search
CPC .................................. B01D 47/00; F28C 1/00
USPC ............................. 261/106, 118; 96/271, 322
See application file for complete search history.

(56) References Cited

U.S. PATENT DOCUMENTS 5,606,868 A * 3/1997 Calvert ................. F24F 5/0035
239/145

FOREIGN PATENT DOCUMENTS

CN          106871256 A  *  6/2017  ................ F24F 1/02

* cited by examiner

*Primary Examiner* — Robert A Hopkins
(74) *Attorney, Agent, or Firm* — SZDC Law P.C.

(57) ABSTRACT

A water-cooled fan includes a body having an air inlet and an air outlet; a fan unit corresponding to the air inlet or the air outlet; an installation slot placed between the air inlet and the air outlet; and a water supply unit disposed above the installation slot. A method for controlling a multifunctional fan includes configuring a functional space and providing a water supply unit at a top end of the functional space; optionally providing a honeycomb or an air filter unit in the functional space; and when the honeycomb is provided in the functional space, providing, by the water supply unit, dampening water for the honeycomb. The present invention can selectively achieve the effect of air humidification or air purification by using a honeycomb or an air filter unit as needed, and the water-cooled fan of the present invention has high intelligence. A multi-purpose set reduces the cost.

17 Claims, 7 Drawing Sheets

WATER-COOLED FAN AND METHOD FOR CONTROLLING MULTIFUNCTIONAL FAN

This application claims priority to Chinese Patent Application No.: 201810809088.X, filed Jul. 18, 2018, which is incorporated by reference for all purposes as if fully set forth herein.

TECHNICAL FIELD

The present application relates to a water-cooled fan and a method for controlling a multifunctional fan, and more particularly to an artificial intelligence (AI) based water-cooled fan.

BACKGROUND

In the prior art, for example, Taiwan Patent Application No. M554135U discloses a water-cooled fan structure including an air inlet, an air outlet, a fan unit, a water supply unit and a honeycomb structure. The honeycomb structure is disposed between the air inlet and the air outlet. The water supply unit is disposed below the honeycomb structure. The bottom end of the honeycomb structure is wetted in the water supply unit. The problems that exist at least include: only a humidification function can be realized, but no air purification function provided.

SUMMARY

It is an object of the present invention to provide a method for controlling a water-cooled fan and a multifunctional fan to overcome the deficiencies in the prior art.

To achieve the above object, the present invention provides the following technical solutions:

The embodiment of the present application discloses a water-cooled fan, comprising:

a body with an air inlet and an air outlet;

a fan unit corresponding to the air inlet or the air outlet;

an installation slot placed between the air inlet and the air outlet; and a water supply unit disposed above the installation slot.

Preferably, in the above-mentioned water-cooled fan, the installation slot is detachably provided with a honeycomb.

Preferably, in the above-mentioned water-cooled fan, an air filter unit is detachably provided in the installation slot.

Preferably, in the above-mentioned water-cooled fan, the air filter unit comprises a purifying screen and a diversion trench, the diversion trench is arranged at least on a top edge and a side edge of the purifying screen, and the diversion trench corresponds to a water outlet of the water supply unit.

Preferably, in the above-mentioned water-cooled fan, the water supply unit is a water sink, and a bottom end of the water sink connects to a top end of the installation slot.

Preferably, the above-mentioned water-cooled fan further comprises a water tank disposed below the installation slot, the water tank is connected to a bottom end of the installation slot.

Preferably, in the above-mentioned water-cooled fan, a water pump is disposed between the water tank and the water sink, and the water tank, the water pump, the water sink, and the installation slot are sequentially connected to form a circulating waterway.

Preferably, in the above-mentioned water-cooled fan, a breakwater cap is disposed in the water sink, and a water retaining surface of the breakwater cap is opposite to a water pumping port of the water sink.

Preferably, in the above-mentioned water-cooled fan, the water pumping port is placed at a bottom of the water sink.

Preferably, in the above-mentioned water-cooled fan, a top end of the water sink is placed with a hole that covers an openable cover.

Preferably, in the above-mentioned water-cooled fan, a water level sensor is disposed in the water sink.

Preferably, in the above-mentioned water-cooled fan, the fan unit is disposed between the installation slot and the air outlet.

Preferably, in the above-mentioned water-cooled fan, the fan unit comprises a air blower.

Preferably, in the above-mentioned water-cooled fan, a bottom end of the body is provided with the cast dish.

Preferably, in the above-mentioned water-cooled fan, the air outlet is provided with a wind direction adjustment grid.

Preferably, the above-mentioned water-cooled fan further comprises a motor coupled to the wind direction adjustment louver.

The present application also discloses a method for controlling a multifunctional fan, comprising:

configuring a functional space and providing a water supply unit at a top end of the functional space;

optionally providing a honeycomb or an air filter unit in the functional space; and when the honeycomb is provided in the functional space, providing, by the water supply unit, dampening water for the honeycomb.

Preferably, the above-mentioned method for controlling a multifunctional fan further comprises an identification unit configured to identify whether the honeycomb or the air filter unit is disposed in the functional space.

Preferably, in the above-mentioned method for controlling a multifunctional fan, the water supply unit stops operating when the air filter unit is in the functional space.

Preferably, in the above-mentioned method for controlling a multifunctional fan, the multifunctional fan is controlled by voice.

Compared with the prior art, the present invention has the advantages that the present invention can selectively use the honeycomb or the air filter unit to realize the effect of water cooling or air purification as needed. One set with two uses, reducing the cost.

BRIEF DESCRIPTION OF THE DRAWINGS

In order to more clearly illustrate the embodiments of the present application or the technical solutions in the prior art, the drawings to be used in the embodiments or the description of the prior art will be briefly described below. Obviously, the drawings in the following description are only a few embodiments described in the present application, and other drawings can be obtained from those skilled in the art without any creative work.

DETAILED DESCRIPTION

Figure 1:
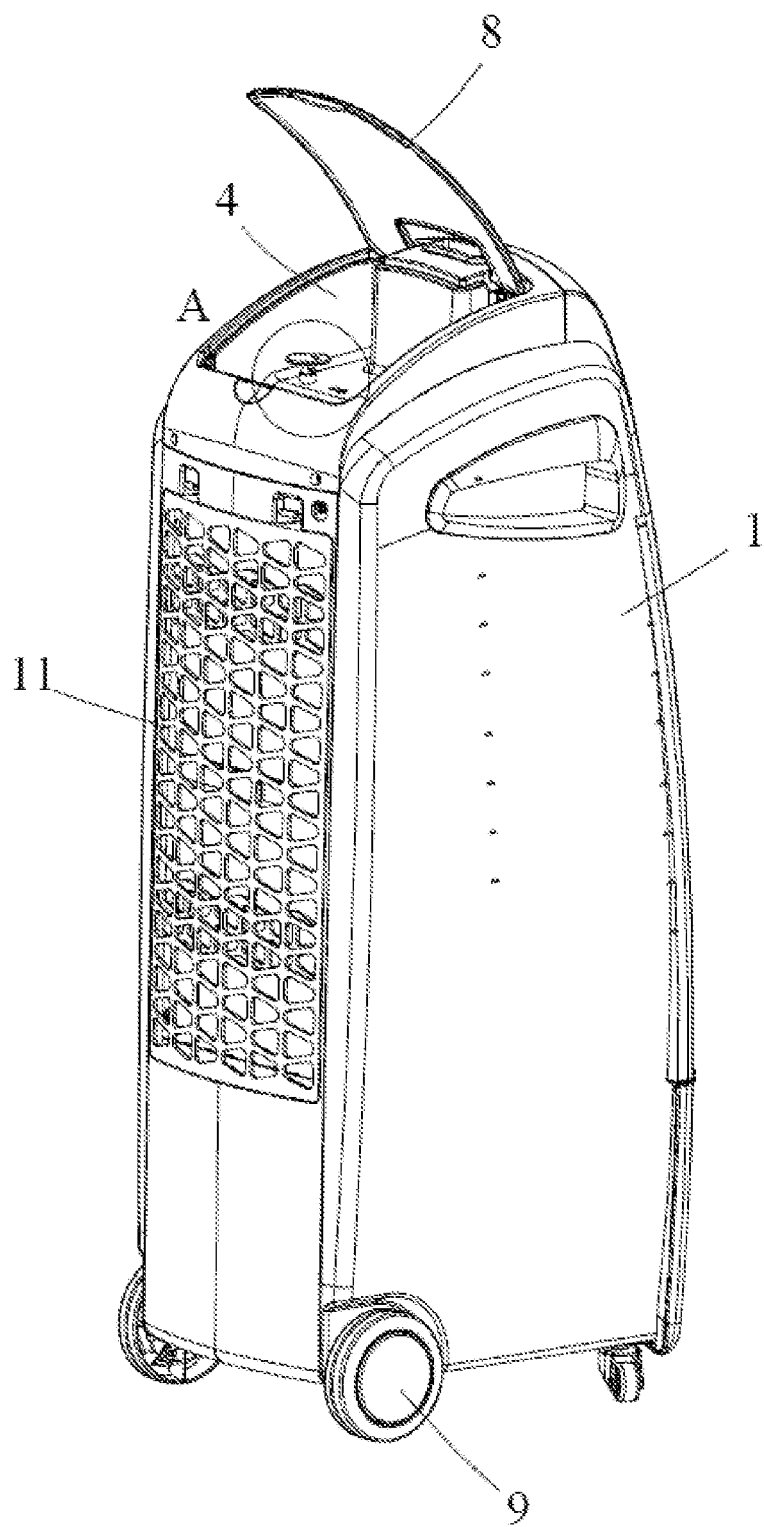
FIG. 1 is a perspective view showing a water-cooled fan according to a specific embodiment of the present invention.

The technical solutions of the present invention will be clearly and completely described in the following with reference to the accompanying drawings. It is obvious that the described embodiments are a part of the embodiments of the present invention, and not all of the embodiments. All other embodiments obtained by a person of ordinary skill in the art based on the embodiments of the present invention without creative efforts are within the scope of the present invention.

In the description of the present invention, it should be noted that the orientations or positional relationships indicated by the terms "center", "up", "down", "left", "right", "vertical", "horizontal", "inside", "outside", etc. are based on the orientations or positional relationships shown in the drawings, which are merely for the convenience of describing the present invention and simplifying the description and do not indicate or imply that the device or component referred to necessarily has a specific orientation or have to be constructed or operated in a specific orientation, and therefore shall not to be construed as limiting the present invention. Moreover, the terms "first," "second," and "third" are used for descriptive purposes only and are not to be construed as indicating or implying relative importance.

In the description of the present invention, it should be noted that, unless otherwise explicitly specified and defined, the terms "install", "coupled", and "connected" are to be understood broadly, and for example may be fixedly or detachably connected, or integrally connected; may be mechanically connected or electrically connected; may be directly connected, or indirectly connected through an intermediate medium, and may be the internal communication of the two components. The specific meaning of the above terms in the present invention can be understood in a specific case by those skilled in the art.

Figure 2:
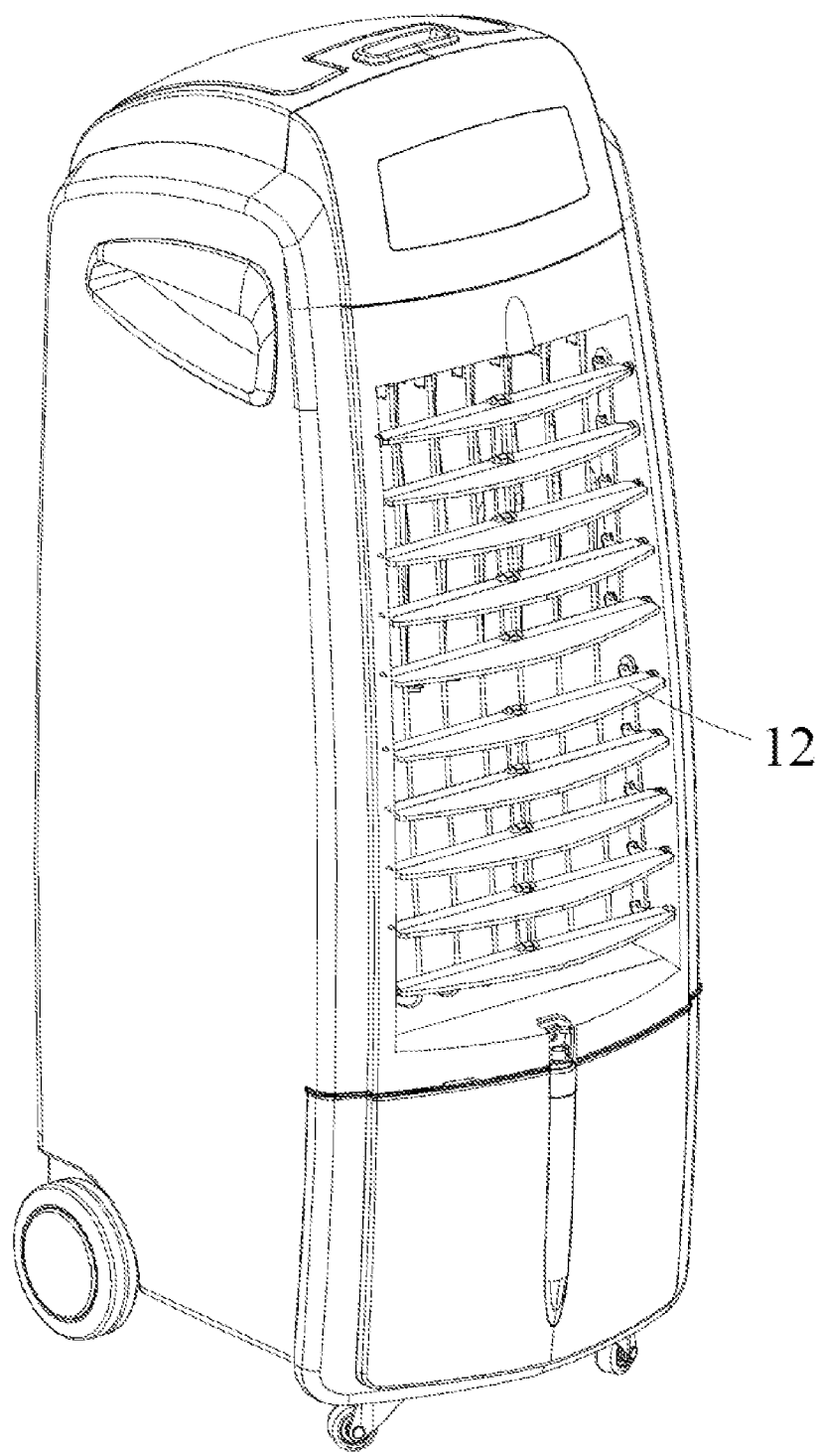
FIG. 2 is another perspective view showing a water-cooled fan according to a specific embodiment of the present invention.
Figure 3:
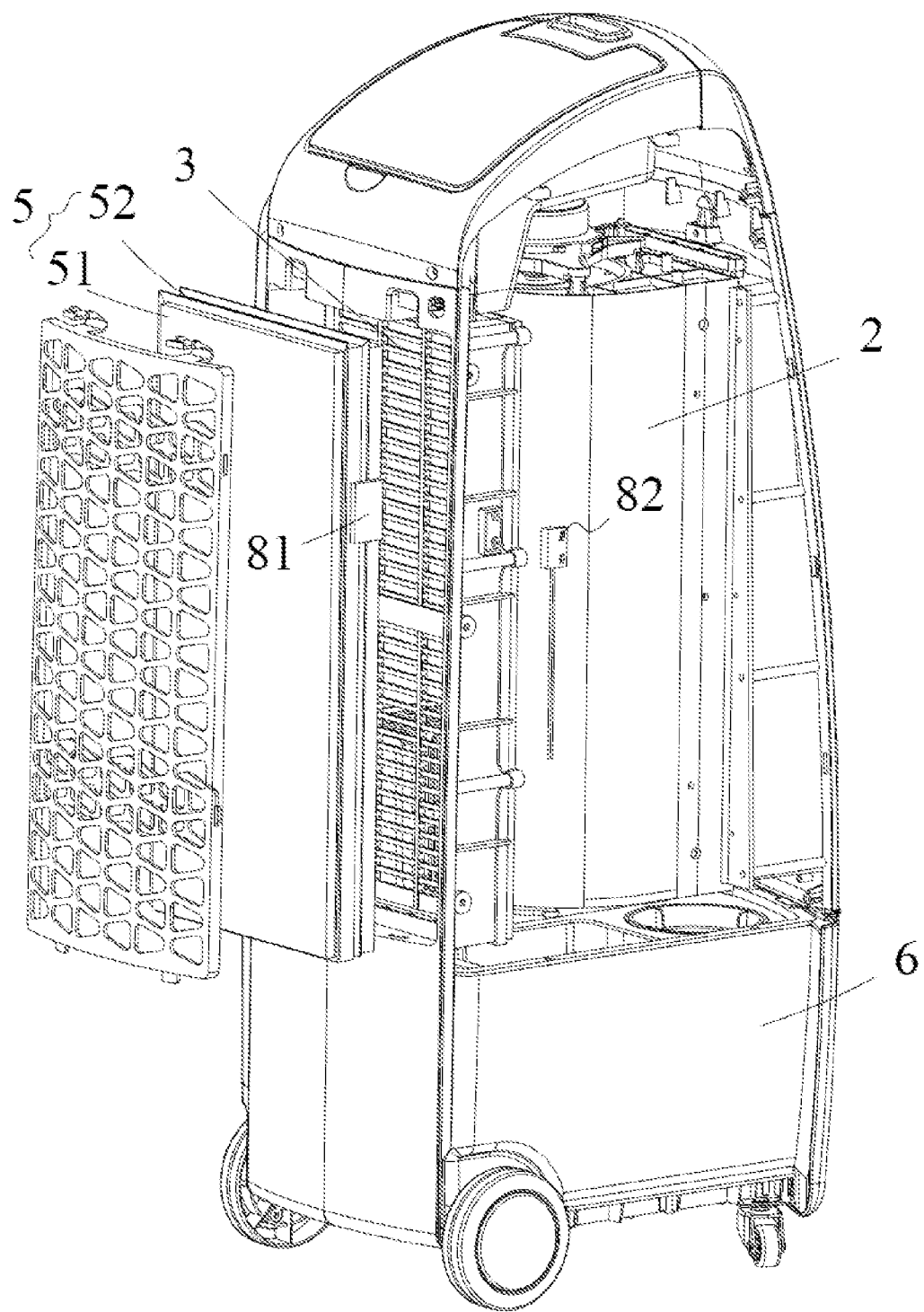
FIG. 3 is a schematic exploded view showing a water-cooled fan according to an embodiment of the present invention.

As shown in FIG. 1 to FIG. 3, in an embodiment of the present application, a water-cooled fan is provided, including a body 1, a fan unit 2, an installation slot 3, and a water supply unit 4.

There are an air inlet 11 and an air outlet 12 on the body 1. The fan unit 2 is disposed between the air inlet 11 and the air outlet 12. The installation slot 3 is formed between the air inlet 11 and the air outlet 12. The water supply unit 4 is disposed above the installation slot 3.

In an embodiment, a honeycomb (not shown) is detachably disposed in the installation slot 3.

In this case, the honeycomb can be used together with a negative pressure fan. The honeycomb is disposed in the installation slot 3 near the air inlet 11 side. The fan is installed at the other end near the air outlet 12. The fan is cooled to extract the indoor air and generate a negative pressure to force the outdoor air to flow through the surface of the honeycomb, humidifying the air, forcing the temperature of the air entering the room to decrease, and continuously introducing into the room for heatstroke prevention and cooling.

In this technical solution, the water supply unit 4 is used to pass water, and water flows in from the top of the honeycomb and keeps the honeycomb wet.

In an embodiment, the honeycomb adopts a paper honeycomb structure material or other similar functioned material. When water flows in, a water film can be formed on the corrugated fiber surface of the honeycomb. When the fast flowing air passes through the honeycomb, the dry gas becomes wet. The temperature of the humid air which enters the indoor space under the action of the fan is lower than the temperature of the dry gas, so as to humidify and cool the air.

In an embodiment, an air filter unit 5 is detachably disposed in the installation slot 3.

The air filter unit 5 is a device that collects dust and other allergenic substances from the gas-solid two-phase flow by the action of a porous filter material, and purifies the gas. It purifies the air with low dust content and sends it into the room to ensure the cleaning process requirements of the room and the cleanliness of general air-conditioned room.

The air filter unit 5 can be set according to the requirements of different air purification levels, and a filter element thereof can be made of glass fiber filter paper, polyethylene foam, non-woven fabric, wire mesh, glass fiber, nylon mesh, and the like.

In this technical solution, the water source of the honeycomb is supplied through the water supply unit 4 at a top end thereof, and the water supply of the honeycomb by the water supply unit 4 is relatively easy to control. For example, when the honeycomb needs to be replaced, the water supply unit 4 can stop the water supply to the honeycomb and the honeycomb can be removed at this time.

At the same time, this also makes it possible to install the air filter unit 5, since air filtration does not require water for normal operation. In an embodiment, the water supply unit 4 is stopped, the air filter unit 5 is installed in the installation slot 3, and the fan unit 2 is activated to allow external air to pass through the air filter unit 5 under air pressure to achieve air purification.

It can be seen that the device of the present invention can selectively use the honeycomb or the air filter unit 5 to achieve the effect of water cooling or air purification as needed. One set with two uses, reducing the cost.

Figure 4:
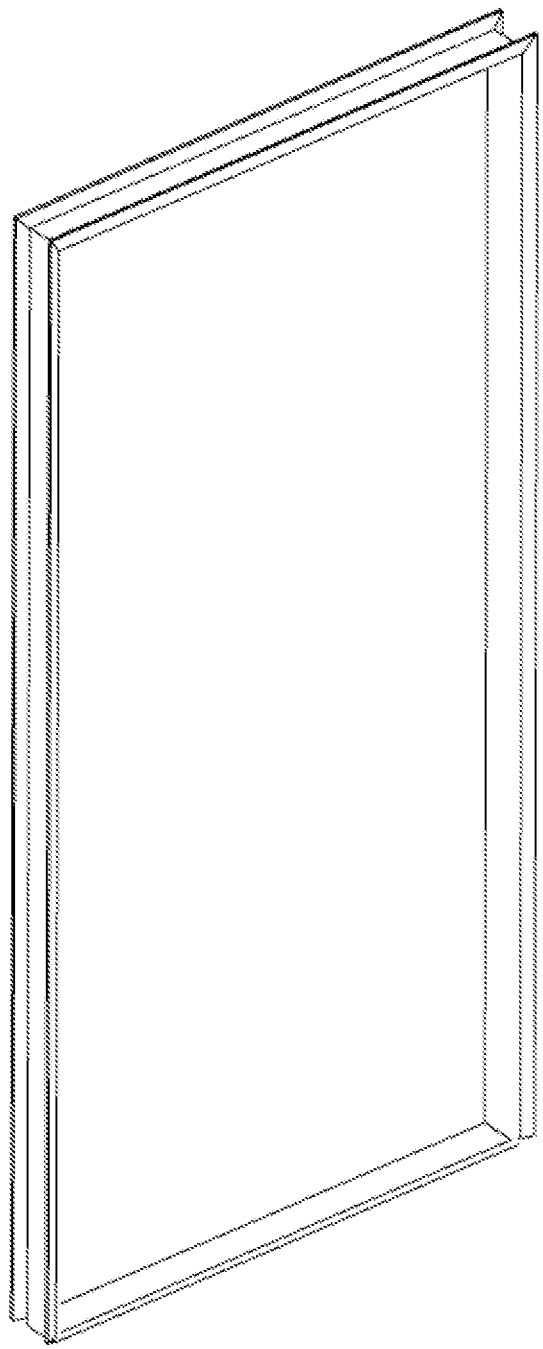
FIG. 4 is a schematic structural view showing a diversion trench according to a specific embodiment of the present invention.

As shown in FIG. 4, the air filter unit 5 includes a purifying screen 51 and a diversion trench 52. The diversion trench 52 is disposed at least on a top edge and a side edge of the purifying screen 51, and the diversion trench 52 corresponds to a water outlet 44 of the water supply unit 44.

In this technical solution, without diversion trench, the purifying screen is prone to wet and fail; therefore, a diversion trench is provided here, such that the water is drained through the diversion trench to a return water outlet at the bottom of the installation slot. In this way, the purifying screen of the device is protected.

In an embodiment, the water supply unit 4 is a water sink. A bottom end of the water sink connects to a top end of the installation slot 3.

Further, a water tank 6 is further provided. The water tank 6 is disposed below the installation slot 3. The water tank 6 connects to the return water outlet of the bottom end of the installation slot 3.

Figure 5:
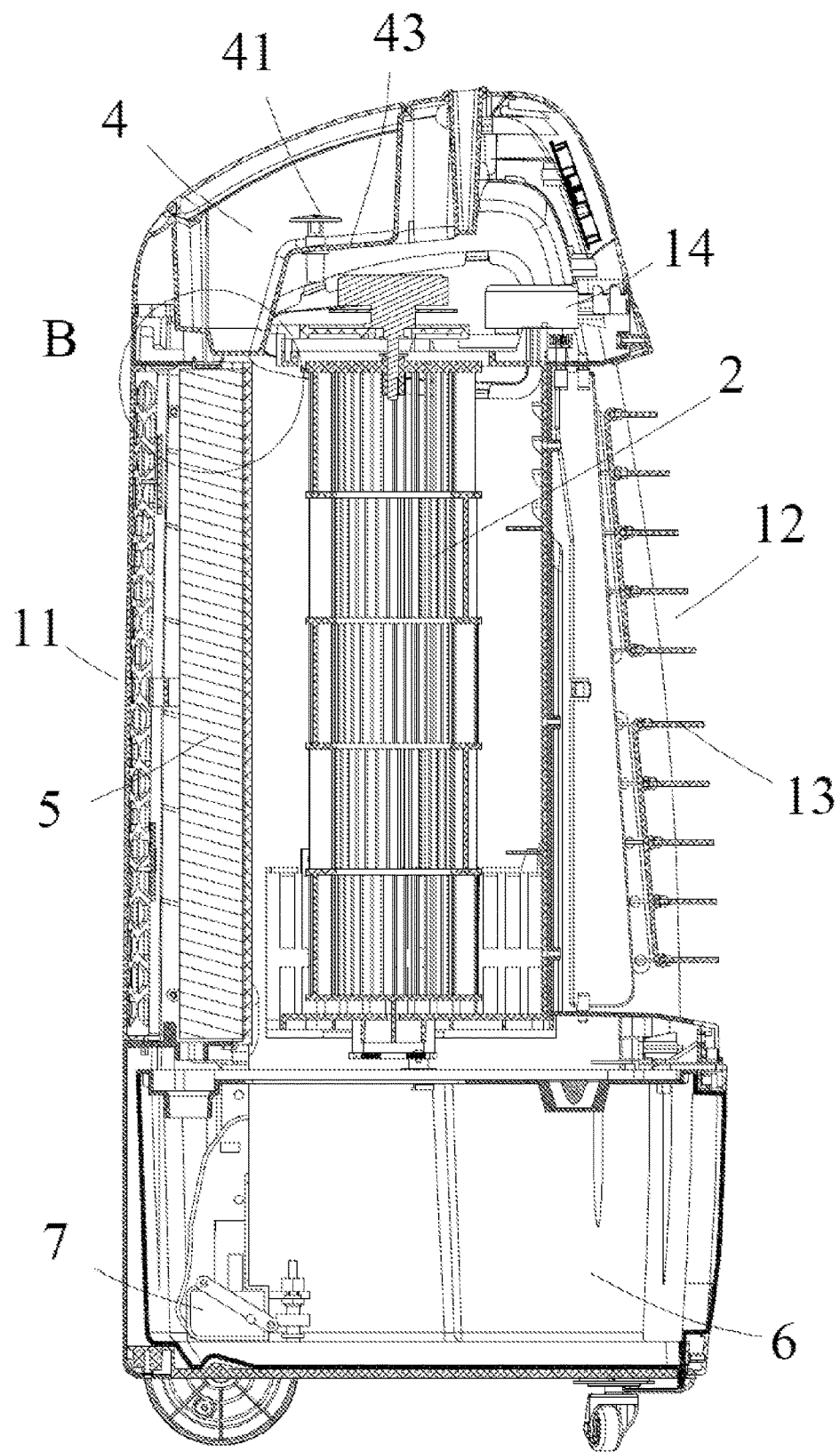
FIG. 5 is a cross-sectional view showing a water-cooled fan according to a specific embodiment of the present invention.

As shown in FIG. 5, a water pump 7 is disposed between the water tank 6 and the water sink. The water tank 6, the water pump 7, the water sink, and the installation slot 3 are sequentially connected to constitute a circulating waterway.

In the technical scheme, the provision of the circulating waterway can save the use of water, and at the same time, the liquid level in the water sink can be controlled by the control of the water pump. In addition, when the honeycomb needs to be replaced with the air filter unit 5, the water pump can stop working. After the water in the water tank is completely released, the honeycomb can be taken out.

It should be noted that in the air purification work process, it is necessary to keep the water pump stopped at all times, and prevent the water from entering the installation slot 3 to wet the air filter unit 5, thereby affecting the air purification effect.

In this embodiment, the control of the water pump can provide possibilities for intelligent control.

In order to control the risk of water entering the air filter unit 5 and to achieve intelligent control, an identification device may also be provided for determining whether the air filter unit 5 or the honeycomb is located inside the installation slot 3. When the air filter unit 5 is present, a safety device is started to avoid water accidentally starting.

In an embodiment, the identification device may include a chip 81 and a chip sensor 82. The chip 81 may be installed on the air filter unit 5 or the honeycomb. The chip sensor 82 may be correspondingly installed in the installation slot 3 or on the body 1.

Since the chip has the uniqueness of recognition, when the air filter unit 5 or the honeycomb is disposed in the installation slot 3, it can be determined whether the air filter unit 5 or the honeycomb is located inside the installation slot 3 by the reading of the chip sensor.

In other embodiments, the identification device may also be a graphic code and a graphic code reading device. For example, the graphic code is a barcode, a two-dimensional code or other pattern disposed on the air filter unit 5 or the honeycomb. The graphic code reading device determines whether the air filter unit 5 or the honeycomb is located inside the installation slot 3 by the reading of different patterns.

In order to control the opening and closing of the water supply of the water sink to the installation slot 3, in other embodiments, a water drop hole is formed between the water sink and the installation slot 3. An electric drive valve, such as a solenoid valve, is provided at the position of the water drop hole. The control of the valve can achieve the hole and closing between the water sink and the installation slot 3.

In this embodiment, a certain amount of water can be pre-stored in the water sink. When the honeycomb needs to be wetted, the valve can be opened. The valve can be closed when the work is stopped or the air filter unit 5 needs to be replaced.

Thanks to the electric drive valve, it can facilitate intelligent control.

In an embodiment, the water source in the water sink may also be provided externally, in which case the water in the water tank 6 needs to be periodically discharged.

In an embodiment, the water supply unit 4 may also be a direct shower head, and water is sprayed directly from the outside onto the honeycomb.

Figure 6:
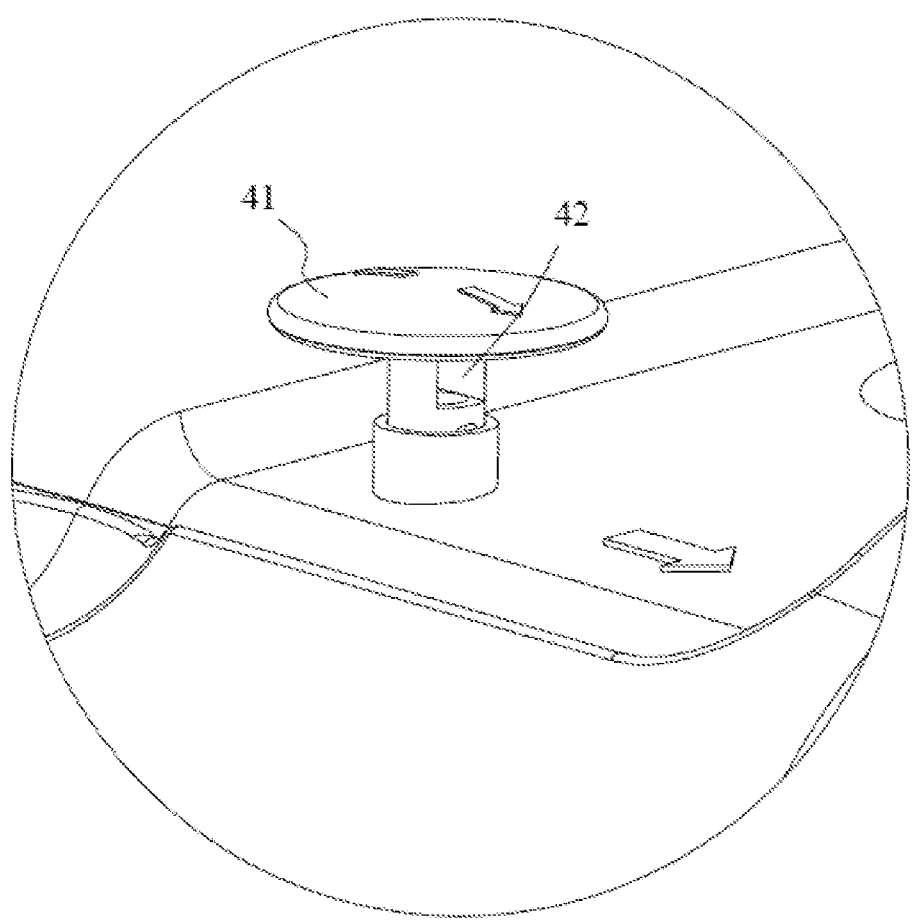
FIG. 6 is an enlarged schematic view showing A in FIG. 1.

As shown in FIG. 6, a breakwater cap 41 is disposed in the water sink. A water retaining surface of the breakwater cap 41 is opposite to a water pumping port 42 of the water tank.

The water flow is pumped from the water tank 6 into the water sink through the water pump. In order to reduce the length of the pipeline and make the body 1 as compact as possible, the water pumping port 42 of the water sink is formed at the bottom of the water sink. If the breakwater cap is not provided, the water entering the water sink is easily splashed upward. If the top of the water sink is not well sealed, water will seep from the top of the body 1.

In addition, when the water flows into the water sink, the water flow is too large, which is likely to cause disturbance and affect stability. In the technical solution, by directly providing a breakwater cap, direct upward impact of the water flow can be avoided. The breakwater cap can laterally disperse the water flow through the blocking surface at the bottom end.

Figure 7:
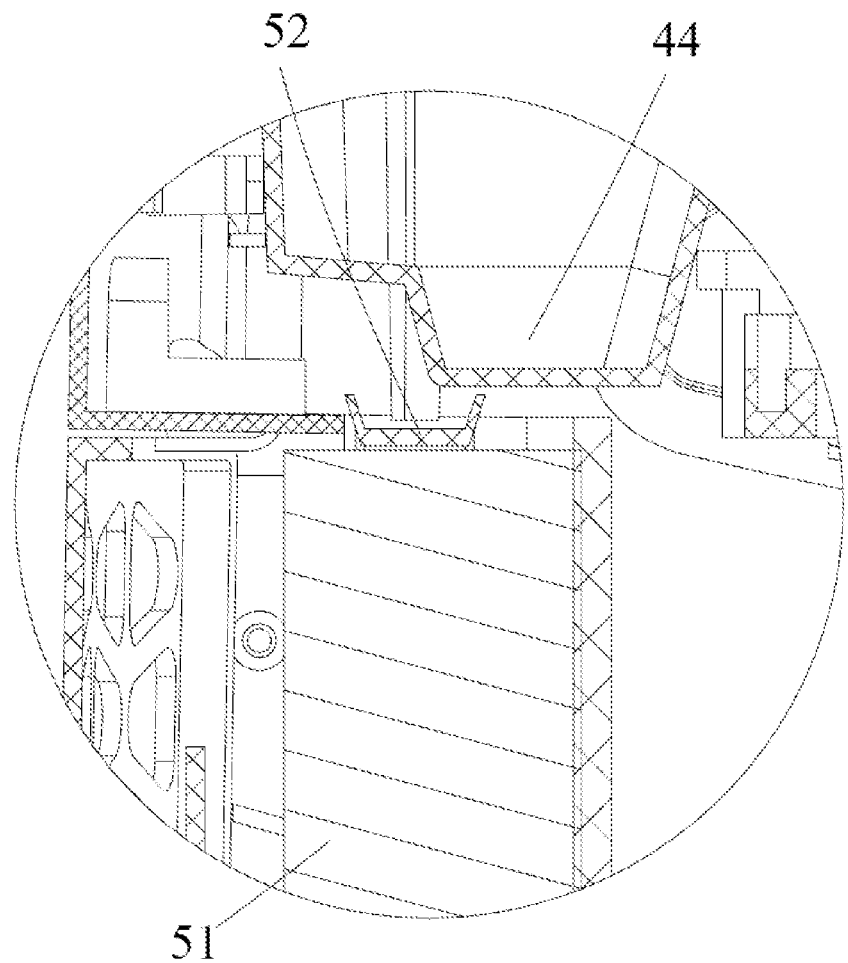
FIG. 7 is an enlarged schematic view showing B in FIG. 5.

In an embodiment, as shown in FIG. 7, a step portion 43 is formed in the water sink. The water pumping port 42 is formed above the step portion 43. When the water flows into the water sink, the water can flow along the slope of the step portion to reach the water outlet 44.

Further, a hole is formed at the top of the water sink. This hole is covered by an openable cover 8.

In the technical solution, by opening the cover 8, it is convenient to place ice cubes in the water sink, and at the same time, it is convenient to clean the inside of the water sink and install and repair the components in the water sink.

In a preferred embodiment, the cover is attached to the body 1 in a flipped manner.

In an embodiment, a water level sensor is disposed within the water sink.

In the technical solution, the water level sensor is mainly used to limit the minimum water level in the water tank, to avoid dry burning of the water pump when the water level in the water tank is low or there is no water.

The maximum water level in the water tank can be observed by the naked eye by providing a scale. In this technical solution, the housing of the water tank is required a certain transparency or at least a transparent window.

The maximum water level in the water tank can also be limited by the water level sensor. The maximum water level can be used to avoid overflow of water. During operation, the water level sensor connects to a control device. When the maximum set water level is reached, the control device automatically controls the water pump to stop working or reduce the water supply.

In an embodiment, the fan unit 2 is disposed between the installation slot 3 and the air outlet 12.

Further, the fan unit 2 includes a air blower.

In the technical solution, the fan is disposed between the installation slot 3 and the air outlet 12. The external air is forced to pass through the installation slot 3 by means of a negative pressure. The airflow after being purified or humidified is led to the air outlet 12 for discharge.

In other embodiments, the fan may also be disposed between the air inlet 11 and the installation slot 3. The airflow is directly applied to the installation slot 3 for humidification or purification by means of a positive pressure.

In an embodiment, the bottom end of the body 1 is provided with the cast dish 9.

In the technical solution, the overall movement of the body 1 can be facilitated by the cast dish, and is particularly suitable for use in places such as homes and offices.

In an embodiment, the air outlet 12 is provided with a wind direction adjustment louver 13.

Further, a motor 14 coupled to the wind direction adjustment louver is also included.

In the technical solution, the wind direction adjustment louver can realize the up and down wind direction angle adjustment, and can also realize the left and right wind direction angle adjustment. The wind direction adjustment louver is driven by the motor to rotate, thereby facilitating intelligent control.

In other embodiments, the adjustment of the wind direction adjustment louver may be implemented using a steering gear or the like.

In this technical solution, in order to realize intelligent control of the fan, a plurality of methods can be selected for control, including:

1. Panel control. A control panel is arranged at the top of the body 1. The control panel can be controlled by means of a button or a touch screen. The functions may include cooling, air purification, humidification, negative ion, etc., and may also include fan power level selection, air-out louver angle adjustment.

2. Voice control. It is necessary to provide a voice recognition unit in a control module, and realize the selection of different functions by recognizing a voice control command.

3. Remote control. The control module on the body 1 can communicate with a remote mobile phone, computer, speaker and other terminals through a wireless module, and realize the control of the fan remotely.

4. A humidity sensor, a temperature sensor, an air quality sensor, etc. can also be provided. The operating rate and operating mode of the water-cooled fan can be adjusted according to the data detected by the sensors of different functions to realize artificial intelligence.

In summary, the working principle of the present invention is that different functions can be realized by providing different screens in the installation slot. For example, a honeycomb can be used to achieve a water cooling function, and an air purification function can be realized by an air filter element.

When a honeycomb is used, a certain amount of water is stored in the water tank in advance. The water pump draws the water in the water tank to the water sink at the top of the honeycomb through water circulation. The water enters the installation slot from the bottom water outlet of the water sink and wets the honeycomb. Excess water flows into the water tank from the water return port at the bottom of the installation slot to form a complete water cycle. The fan unit is activated. The fan is cooled to extract the indoor air and generate a negative pressure to force the outdoor air to flow through the surface of the wet honeycomb, so that a large amount of heat in the air is converted to force the temperature of the air entering the room to be lowered and continuously introduced into the room for heatstroke prevention and cooling.

When an air filter element is used, the water is first discharged by the water pump to the water sink through water tank 6, and then flows to the bottom through the water outlet 44. Without diversion trench, the purifying screen is prone to wet and fail. By providing a diversion trench, the water is drained to the water return port through the diversion trench and finally returned to the water tank, in such a way as to protect the purifying screen of the set. During operation, the fan draws out indoor air and generates a negative pressure to force the outdoor air to flow through the purifying screen to achieve air purification.

Finally, it should be noted that the above embodiments are merely illustrative of the technical solutions of the present invention, and are not intended to be limiting. Although the present invention has been described in detail with reference to the foregoing embodiments, those skilled in the art will understand that the technical solutions described in the foregoing embodiments may be modified, or some or all of the technical features may be equivalently replaced; and the modifications or substitutions do not deviate from the scope of the technical solutions of the embodiments of the present invention.

What is claimed is:

1. A water-cooled fan, comprising:
a body having an air inlet and an air outlet;
a fan unit corresponding to the air inlet or the air outlet;
an installation slot placed between the air inlet and the air outlet; and
a water supply unit disposed above the installation slot,
wherein an air filter unit is detachably provided in the installation slot, and
wherein the air filter unit comprises a purifying screen and a diversion trench, the diversion trench is arranged at least on a top edge and a side edge of the purifying screen, and the diversion trench corresponds to a water outlet of the water supply unit.

2. The water-cooled fan of claim 1, wherein the installation slot is detachably provided with a honeycomb.

3. The water-cooled fan of claim 1, wherein the water supply unit is a water sink, and a bottom end of the water sink connects to a top end of the installation slot.

4. The water-cooled fan of claim 3, further comprising a water tank disposed below the installation slot, the water tank connected to a bottom end of the installation slot.

5. The water-cooled fan of claim 4, wherein a water pump is disposed between the water tank and the water sink, and the water tank, the water pump, the water sink, and the installation slot are sequentially connected to form a circulating waterway.

6. The water-cooled fan of claim 3, wherein a breakwater cap is disposed in the water sink, and a water retaining surface of the breakwater cap is opposite to a water pumping port of the water sink.

7. The water-cooled fan of claim 6, wherein the water pumping port is formed at a bottom of the water sink.

8. The water-cooled fan of claim 3, wherein a top end of the water sink is a hole that covered by an openable cover.

9. The water-cooled fan of claim 3, wherein a water level sensor is disposed in the water sink.

10. The water-cooled fan of claim 1, wherein the fan unit is disposed between the installation slot and the air outlet.

11. The water-cooled fan of claim 10, wherein the fan unit comprises a wind deflector.

12. The water-cooled fan of claim 1, wherein a bottom end of the body is provided with a roller.

13. The water-cooled fan of claim 1, wherein the air outlet is provided with a wind direction adjustment grid.

14. The water-cooled fan of claim 13, further comprising a motor coupled to the wind direction adjustment grid.

15. A method for controlling a multifunctional fan, comprising:
configuring a functional space and providing a water supply unit at a top end of the functional space;
optionally providing a honeycomb or an air filter unit in the functional space; and
when the honeycomb is provided in the functional space, providing, by the water supply unit, dampening water for the honeycomb,
wherein the multifunctional fan is controlled by voice.

16. The method for controlling a multifunctional fan of claim 15, further comprising an identification unit configured to identify whether the honeycomb or the air filter unit is disposed in the functional space.

17. The method for controlling a multifunctional fan of claim 16, wherein the water supply unit stops operating when the air filter unit is in the functional space.

\* \* \* \* \*